Figures 1, 2:
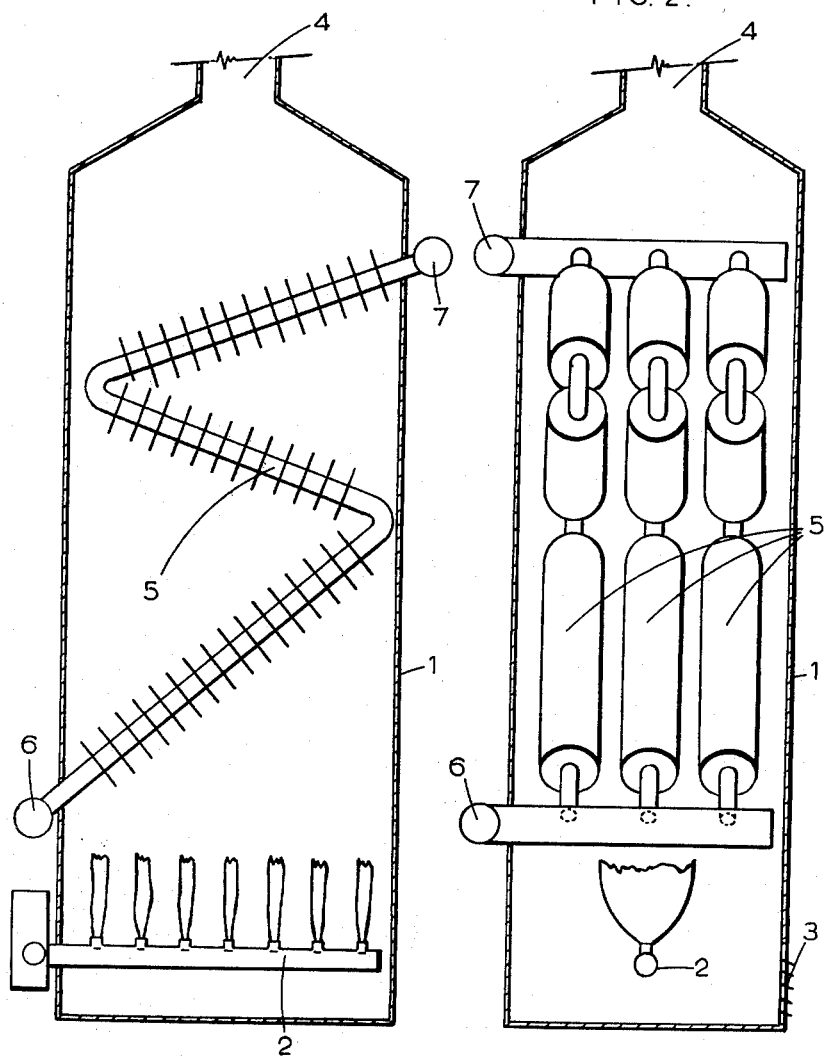

Aug. 17, 1965 W. DAVIDSON ETAL 3,201,045
COMBINED SPACE HEATING AND DOMESTIC HOT WATER HEATING SYSTEM
Filed March 1, 1963 3 Sheets-Sheet 1

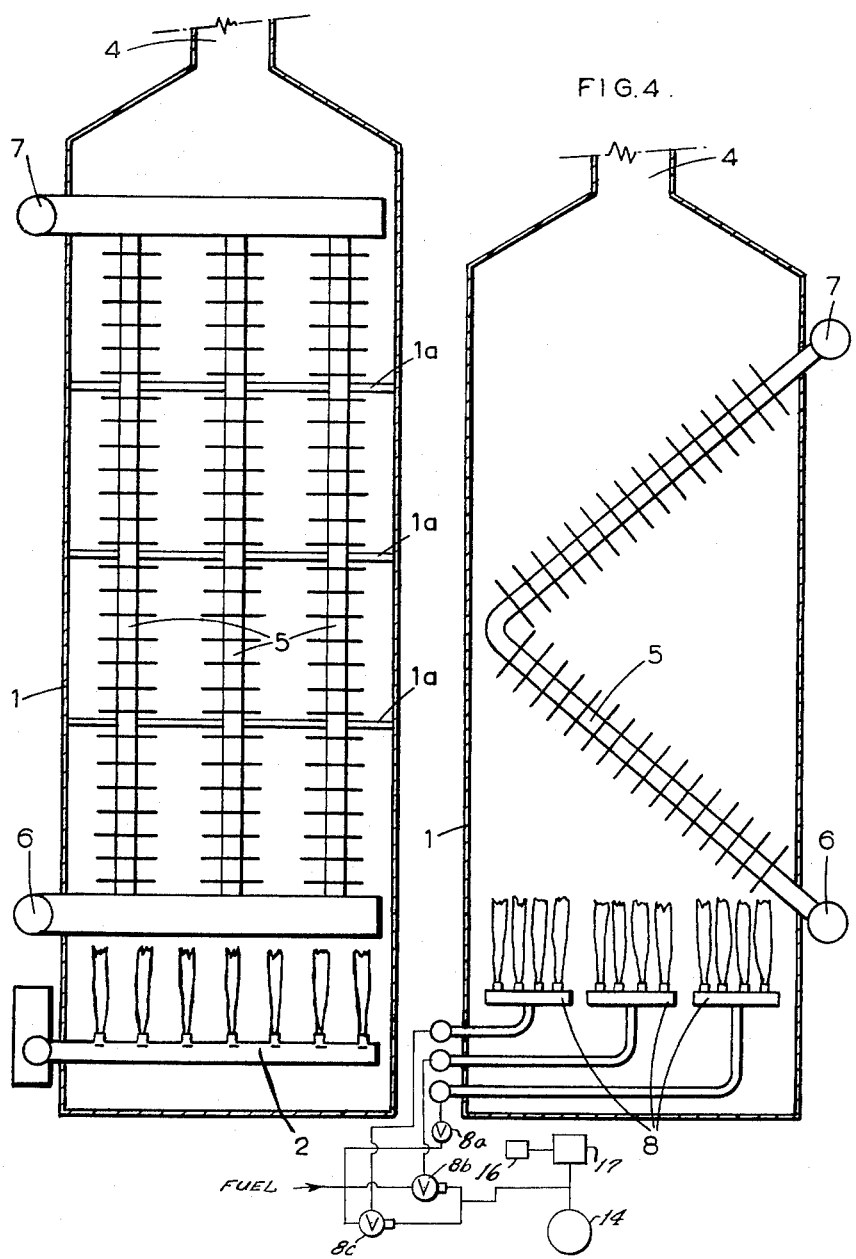

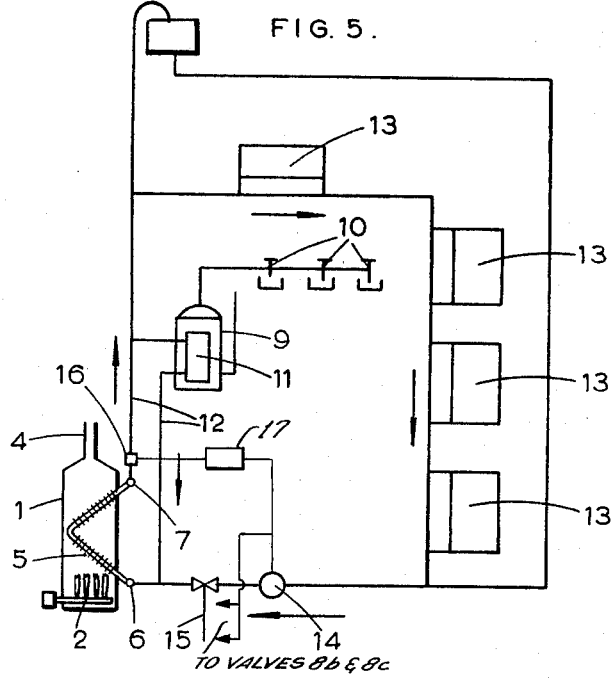
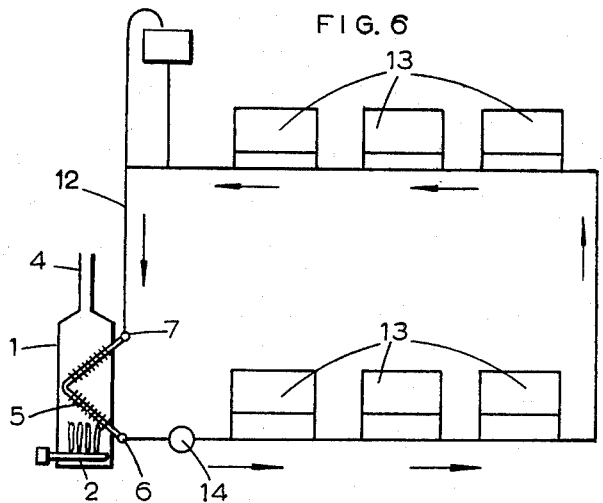

United States Patent Office 3,201,045
Patented Aug. 17, 1965

3,201,045
COMBINED SPACE HEATING AND DOMESTIC HOT WATER HEATING SYSTEM
William Davidson, Gerrards Cross, Leonard Arthur Steer, West Molesey, and Alfred Perrin, Woking, England, assignors to C.D. Patents Limited, London, England, a British company
Filed Mar. 1, 1963, Ser. No. 261,985
Claims priority, application Great Britain, Mar. 19, 1962, 10,449/62
1 Claim. (Cl. 237—8)

This invention relates to water heaters and to water heating systems.

In a known form of gas water heater, the water to be heated can flow through coils of finned tubing arranged in a combustion chamber, the finned coils extending horizontally across the chamber and usually being connected in series to form a continuous single coil. The water is heated by the upward flow of gas combustion products through the combustion chamber. This arrangement is quite satisfactory for many purposes, but it has the disadvantage of offering high resistance to the flow of water so that it cannot be used for gravity circulation to a hot water cylinder or radiators and where used for pumped circulation in heating systems, a comparatively high duty pump is required to overcome the high resistance to water flow through the heater.

An object of the present invention is to provide a way of avoiding this disadvantage. A water heater according to the invention comprises a combustion chamber, a burner at the lower end of the chamber, and a finned tube extending vertically or at an upward inclination within the chamber from a lower water inlet to an upper water outlet. A plurality of such finned inclined tubes can be connected in parallel between a common inlet header and a common outlet header so that the resistance to water flow is much less than in a heater of comparable output, but with series-connected or continuous coils and with horizontal coils for heating the water. The finned tube can be straight or formed to a V, or Z shape.

It is also known that with conventional water heaters or boilers, they are most economical when used at their full rated output and that when used for considerably lower outputs, their overall efficiency is substantially reduced.

For example, where a water heater or boiler of conventional design is used for space heating plus domestic hot water supply, it is uneconomical to use it for domestic hot water only (as for summer use when no space heating is required) since the overall efficiency of heating is greatly reduced for the lower heat demand. It is, therefore usual to recommend that an additional heater of lower output be used in summer for the supply of domestic hot water only.

The invention also provide a way of overcoming this disadvantage. Thus, a water heater constructed in accordance with the invention is arranged in a water heating system comprising a first hot water storage vessel from which hot water can be withdrawn through a tap or taps as desired, a second hot water storage vessel which is located inside the first vessel and is connected with the water heater, a plurality of space heating devices connected wtih the second vessel, a pump for circulating water through the water heater, second vessel and space heating devices, and means for reducing the burning rate of the burner or burners of the water heater when no water is being circulated by the pump.

In the accompanying drawings:
FIGURE 1 is a front view of a water heater according to the invention with a front removed,
FIGURE 2 is an end view of the same heater with an end cover removed,
FIGURES 3 and 4 are views similar to FIGURE 1 of two modified heaters according to the invention,
FIGURES 5 and 6 are schematic diagrams illustrating two water heating systems using the invention.

In all the figures of the drawings like parts are designated by like reference numerals.

In the embodiment of the invention illustrated in FIGURES 1 and 2, a water heater intended for a gravity circulation of water comprises a combustion chamber 1 which is of any convenient form and has a gas or oil burner 2 arranged near the bottom. The combustion chamber 1 has an opening 3 at or near the bottom for the adminission of combustion air and an opening or flue 4 at the top for the discharge of combustion products. A plurality of finned tubes 5 are arranged side by side within the chamber 1. These tubes are of zig-zag or Z shape, each limb of the Z being inclined upwardly. The tubes are connected in parallel to a common external (or, if desired, internal) lower inlet or "return" header 6 for water to be heated and a common external (or, if desired, internal) upper outlet or "flow" header 7 for heated water, the two headers being connected to a hot water storage tank and/or radiators as hereinafter described. Each of the tubes 5 in this example has a plurality of finned straight sections sloping upwards through the chamber, the straight sections being connected by un-finned curved portions to form, for example, a Z shape. The connections between the straight sections must not be such that it will impede the gravity flow of water through the tube.

In operation, the burner is ignited so that the combustion products heat the water in the lower parts of the finned tubes 5 so that the water rises to the flow header 7 from which is passes to the hot water storage cylinder and/or radiators. When the water cools, it passes back to the finned tubes through the return header 6 so as to be re-heated.

The straight sections of the tubes are finned to improve the transfer of heat from the combustion products to the water flowing through the tubes. The curved portions are not finned to assist bending of the tubes or alternatively separate unfinned curved sections can be used to connect the straight sections together.

FIGURE 3 illustrates a slightly modified water heater in which single finned sections 5, connected in parallel to headers 6 and 7 are arranged vertically. Baffles 1a may be provided in the chamber 1 to cause a turbulent flow of combustion gases from the burner 2.

FIGURE 4 illustrates another modification provided with a plurality of independently operable burners 8 instead of a single burner 2. The modification is particularly useful when the water heater is used in the water heating systems illustrated in FIGURES 5 and 6.

In the arrangement illustrated in FIGURE 5, hot water for domestic use can be withdrawn from a first hot water storage tank 9 by taps 10. The water in the storage tank 9 is heated by hot water in a second hot water storage tank 11 connected by piping 12 with the flow header 7 and return header 6 of the water heater. Hot water radiators 13 or other space heating devices are also supplied with hot water from the water heater. A pump 14 circulates hot water in the direction of the arrows through the finned tubes 5, piping 12, second storage tank 11 and radiators 13.

When using the water heater for domestic hot water supply only (i.e. hot water circulation to the radiators 13 is closed off by a valve 15) it is convenient to circulate the hot water from the water heater to the hot water storage tank 11 by gravity, the diameter of the connecting piping being large enough to permit this and the water heater being designed to give the heat output required to satisfy the demand for domestic hot water. When space heating is required in addition to domestic hot water, a considerably increased heat output—usually two, three, four times—is required. This can be obtained efficiently and economically by increasing the circulation rate of the water through the water heater and increasing the burning rate of the fuel by amounts corresponding to the increase of output required by the heater, usually two, three or four times. The water circulation rate is increased by switching on the circulating pump 14, while the burning rate is, when the pump is switched on, automatically increased by the desired amount by bringing into operation one or more additional burners shown in FIGURE 4. The burners can also be controlled by a thermostat 16 responsive to the temperature of water leaving the water heater.

As the room temperature drops, the thermostatic switch 16 effects energization of pump motor 14 by way of the motor control network 17, in the well-known manner and using conventional equipment. Concurrently therewith, the solenoid valves 8b and 8c are energized to open the valves and feed fuel to the additional burners. The hot water burner fuel feed is energized by valve 8a, in usual fashion.

It is found that by the arrangement described, a high water heating efficiency is obtained over these wide ranges of outputs, by controlling the output of the heater more closely to the heating load.

As shown in FIGURE 6, the pump 14 can be used to give forced circulation of the water through the tubes 5 and heating circuit in the reverse direction. Thus, cool water from the heating circuit is taken in at the top of the boiler through header 7 and the hot water from the bottom of the boiler through header 6. With this arrangement, the water in effect flows down through the boiler whereas the hot combustion products pass upwards through the boiler, thus giving counterflow heat exchange between the water and the combustion products. Improved heat exchange is obtained in this way.

What we claim is:

A water heating system comprising a combustion chamber, a plurality of burners within said chamber, said burners being operable independently of one another, a water inlet header disposed above said burners, a water outlet header disposed above said inlet header, a plurality of finned tubes disposed within said chamber above said burners and extending in vertical zigzag paths between said headers so that hot water can flow upwardly through said tubes from one of said headers to the other, a first hot water storge vessel from which hot water for domestic use can be withdrawn as desired, a second hot water storage vessel which is located in said first vessel and is connected with said inlet and outlet headers, a plurality of space heating devices connected *in parallel* with said second vessel, a pump for circulating water through said headers, finned tubes, second vessel and space heating devices, a first of said burners being operative to provide the heat demands of said domestic hot water use, and means for automatically bringing into operation additional of said burners when said pump is set in operation independently of said first burner.

References Cited by the Examiner

UNITED STATES PATENTS

| | | | |
|---|---|---|---|
| 2,073,072 | 3/37 | Pontow et al. | 122—448 |
| 2,122,369 | 6/38 | Gaskell | 122—356 |
| 2,532,608 | 12/50 | Dalin. | |
| 2,553,713 | 5/51 | Levis | 122—356 |
| 2,884,197 | 4/59 | Whittell. | |

FOREIGN PATENTS

| | | |
|---|---|---|
| 1,201,103 | 8/58 | France. |
| 598,274 | 2/48 | Great Britain. |
| 586,315 | 12/58 | Italy. |

EDWARD J. MICHAEL, *Primary Examiner.*

ALDEN D. STEWART, *Examiner.*